Nov. 25, 1941.     R. J. SHOEMAKER     2,264,249
DAM FOR JOURNAL BEARINGS
Filed July 9, 1938
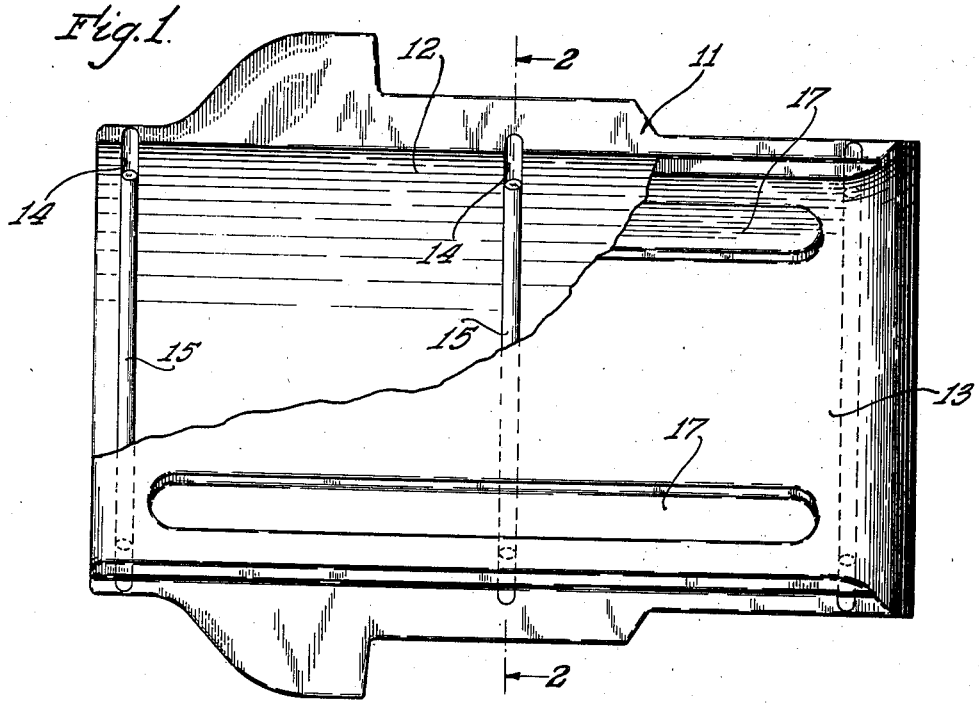
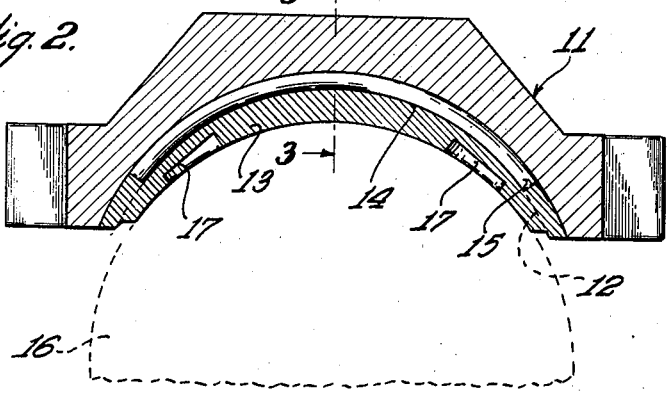
INVENTOR.
Robert J. Shoemaker
BY Charles B. Rasmussen
ATTORNEY.

Patented Nov. 25, 1941

2,264,249

UNITED STATES PATENT OFFICE 2,264,249

DAM FOR JOURNAL BEARINGS

Robert J. Shoemaker, Chicago, Ill., assignor to Magnus Metal Corporation, Chicago, Ill., a corporation of New York Application July 9, 1938, Serial No. 218,420

3 Claims. (Cl. 308—56)

This invention relates in general to improvements in bearings and, while it has more particular reference to journal bearings used on railway rolling stock, it will be apparent that certain features of the invention have other and more general application.

A principal object of the invention is the provision in a journal bearing of means for automatically stopping the oil attacking the bonding material to prevent loosening of the lining from the brass and further to prevent chipping and cracking of the lining due to the loosening of said lining from the brass.

It is well known that oil and other petroleum products have a deleterious effect upon the bonded surface usually employed in the manufacture of journal bearings, since the chemicals found in oil and other petroleum products will attack the usual composition which make up the bond.

It is pointed out, therefore, that the portion of a journal bearing which is most affected by the oil during the operation thereof is the bonded surface between the main body portion and the lining secured thereto. To insure effective adhesion between the main body portion and the lining, a dam is provided in the main body portion to prevent the oil from flowing longitudinally through the bonded surface and to thus prevent the lining loosening from the main body portion. The dams are preferably provided adjacent the ends of the main body portion, but they may also be provided therebetween so that even though the oil may creep or flow past the first dam, it will be prevented from flowing farther than the second or possibly the third dam. The dams are constructed of a material having a higher heat conductivity than that of the main body portion, so that the heat will be transmitted through the bearing more rapidly at the points where the dams extend therethrough. Consequently, the temperature of the oil which reaches a dam will be lowered to a certain extent and it will not flow as readily thereafter, because the heat will be dissipated therefrom more rapidly through the dam than through the material of the main body portion of the bearing.

Another important object of the invention is the provision of a journal bearing which prevents the deteriorating action of the oil upon the bonded surface between the main body portion and the lining by obstructing the passage of the oil therethrough, since lubricating oil, or other petroleum products, has a corrosive action on the solder or other bond employed and will cause the latter to disintegrate, with a consequent failure of the bearing.

Another important object of the invention is the provision of a dam in a journal bearing which is so located between the main body portion and the lining as to substantially eliminate the possibility of the lubricating, or other petroleum products, from coming into contact with the bonded surface.

Numerous other objects and advantages of the invention will be apparent as it is better understood from the following description, which, taken in connection with the accompanying drawing, discloses a preferred embodiment thereof.

In the drawing,

Figure 1 is a bottom plan view of a journal bearing embodying the features of the invention with part of the lining broken away to show the dams mounted in grooves in the concave surface of the main body portion;

Figure 2 is a vertical section taken substantially on the line 2—2 of Fig. 1;

Figure 3 is an enlarged fragmentary sectional view, taken substantially on the line 3—3 of Fig. 2, illustrating the preferred embodiment of the invention; and Figure 4 is an enlarged fragmentary sectional view, similar to Fig. 3, illustrating a modified form of the invention.

Referring more particularly to the drawing, reference numeral 11 indicates in general the body portion of a non-rotary member of a journal bearing, commonly called the "brass," which may be of any desired form and is preferably cast from some suitable alloy. The body portion 11 is provided with a lower concave surface 12 to which is applied a lining 13 of babbitt or other suitable material, which is applied in the usual manner to the surface 12 after it has been tinned or soldered so that it will adhere firmly thereto.

Formed in the lower surface 12 of the main body portion 11, by machining or by being cast therein, are a plurality of transverse grooves or channels 14. Any desired number of these grooves 14 may be provided and they are preferably spaced in parallel relationship to each other and extend completely across the concave surface 12. It is to be understood, however, that at least two grooves be provided, one adjacent each end of the main body portion 11. The grooves 14 are preferably substantially semicircular in cross-section.

In the form of journal shown in Figs. 1, 2 and 3, a rod 15 is positioned in the grooves 14. The rods 15 are preferably circular in cross-section having a diameter equal to approximately the depth of the groove, so that when the rod 15 is placed in the groove 14, the rod is substantially flush with the concave surface 12 of the main body portion 11. It is not necessary to have the rods 15 run all the way up to the edge of the lining 13. Since there is no bearing contact at the edge, there is less danger of the lining becoming loose than if the edge was in contact with the journal 16.

The rods 15 may be positioned in the grooves 14 either before or after the surface 12 is tinned. However, it is preferable to position the rods in the grooves before the surface 12 is tinned, since the babbitt or other suitable material will adhere more closely to a tinned surface than to a plain surface. The lining 13 is then molded or otherwise secured to the main body portion 11 to maintain the rods 15 in place. Those portions of the grooves 14 which are not filled by the rods 15 will function as additional retaining means for the lining, since the latter will fill any such portions of the grooves, as will be seen particularly in Figs. 2 and 3.

The lower surface of the lining 13 is formed to substantially conform to the upper portion of the usual journal 16 (shown in broken lines in Fig. 2) in a well-known manner. A pair of longitudinally extending grooves or channels 17 are machined or molded in this lower surface of the lining 13, and terminate short of the ends of the lining as best seen in Fig. 1, although they may be extended to either or both ends of the lining if desired. Referring to Fig. 2, the channels 17 are preferably flat in cross section to provide an oil retaining well or reservoir.

In this type of journal bearing, lubricating oil is supplied to the outer surface of the journal 16 in the usual manner by means of saturated waste disposed within the journal box (not shown) and contacting the lower surface of the journal, although any other means of supplying a lubricant may be employed if desired.

In the operation of the bearing, rotation of the journal 16 will carry oil into the channel 17 at the inbound side of the journal. The oil collected in the inbound channel will provide sufficient lubrication to the journal and insure a constant lubrication thereof. When the bearing 16 is rotated in the reverse direction the journal will carry oil into the other channel, thus a sufficient supply of oil will always be available to lubricate the bearing 16.

It has been found in the use of ordinary journal bearings that after a limited period of time, the lining 13 will loosen from the main body portion and eventually disintegrate. It is well-known that oil and other petroleum products have a deleterious effect upon the bond usually employed in the manufacture of bearings. By placing rods or dams 15 in the grooves 14 at each end of the bearing and one or more through the central part of the main bearing portion, the loosening of the lining 13 from the main body portion 11 is almost entirely eliminated.

The chemicals in oil or other petroleum products which attack the bearing and act upon the bonding surface between the lining 13 and the curved portion 12 of the main body portion 11 are prevented from so acting because the oil is stopped at the first rod or dam 15 and will be blocked thereby from access to the remainder of the solder or other bonding material on the surface 12. The rod or dam 15 may be made of copper, but any suitable material may be used, such as graphite or the like, which has a higher heat conductivity than the main body portion 11. The oil cannot flow around the dam because of the tortuous passage and is stopped from creeping or flowing longitudinally.

Referring to Fig. 4, a modified form of dam is illustrated. Instead of the semi-circular groove 14, as shown in Figs. 1, 2 and 3, a rectangular groove 18 is cut into the main body portion 11 and a rectangular rod 19 is positioned therein. It has been found that the rectangular rod 19 acts in much the same manner as the rod 15. The rod or dam 19, like the rod 15, preferably has a heat conductivity that is greater than the heat conductivity of the "brass" so that the temperature of the oil is lowered thereby, causing the oil to adhere much more closely to the rod and hence retard the flow of oil longitudinally through the bearing between the main body portion and the lining.

In the relining of the bearing 11, the removal of the lining 13 by the use of heat or the like will remove the members 15 and 19 from the main body portion 11. The addition of a new lining to the body portion will therefore be a relatively simple matter.

It is apparent, therefore, that by using a dam 15 or 19 in the curved surface 12 of the main body portion of the bearing 11, a greater longevity of the bearing is assured. The reason for failure in bearings of this nature is not the fact that the lining wears out or away but that the lining disintegrates and breaks away from the main body portion. By inserting a plurality of dams in the bearing surface 12, therefore, the oil is prevented from flowing longitudinally and attacking the bonding surface and the lining 13 is prevented from loosening. As long as the lining can be made to adhere to the curved surface 12 of the bearing 11, the lining will not be disintegrated and will not break away. At least twice the normal length of operating time and mileage is obtained by the instant bearing, with a resultant reduction in loss of time and an increase in efficiency of the bearing.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a journal bearing, comprising a body portion having a concave surface, a lining secured to said concave surface, and a pair of longitudinally extending channels in the bearing surface of said lining adjacent the lower edges thereof; a plurality of transverse grooves extending across said concave surface, and a plurality of rods positioned in said grooves for preventing oil from creeping longitudinally between said surface and said lining.

2. A journal bearing, comprising a body portion having a concave surface, a plurality of transversely extending grooves formed in said surface, a plurality of rods mounted in said transverse grooves and extending across said surface, a bonding material added to said surface and said rods, and a lining cast upon said concave surface of said body portion, said rods acting as dams to prevent longitudinal flow of oil between said body portion and said lining.

3. A journal bearing, comprising a body portion having a concave surface, a plurality of transversely extending grooves formed in said surface, a plurality of rods mounted in said transverse grooves and extending across said surface, a bonding material added to said surface and said rods, and a lining secured to said concave surface of said body portion, said rods acting as dams to prevent access of the oil to said bonding material.

ROBERT J. SHOEMAKER.